(12) United States Patent
Arnabat Benedicto et al.

(10) Patent No.: US 9,696,950 B2
(45) Date of Patent: Jul. 4, 2017

(54) ANALYSING IMAGE CONTENT

(71) Applicants: HEWLETT-PACKARD DEVELOPMENT COMPANY L.P., Houston, TX (US); Jordi Arnabat Benedicto, Sant Cugat del Valles (ES); Jordi Vilar Benito, Sant Cugat del Valles (ES); Peter Morovic, Sant Cugat del Valles (ES)

(72) Inventors: Jordi Arnabat Benedicto, L'Arboc del Penedes (ES); Jordi Vilar Benito, Castelldefels (ES); Peter Morovic, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/908,372

(22) PCT Filed: Jul. 30, 2013

(86) PCT No.: PCT/EP2013/066001
§ 371 (c)(1),
(2) Date: Jan. 28, 2016

(87) PCT Pub. No.: WO2015/014392
PCT Pub. Date: Feb. 5, 2015

(65) Prior Publication Data
US 2016/0179446 A1    Jun. 23, 2016

(51) Int. Cl.
*G06F 3/12* (2006.01)
*G06K 9/46* (2006.01)

(52) U.S. Cl.
CPC .......... *G06F 3/1254* (2013.01); *G06F 3/1204* (2013.01); *G06F 3/1205* (2013.01); *G06K 9/4642* (2013.01); *G06K 9/4652* (2013.01)

(58) Field of Classification Search
USPC ............... 358/1.1–1.18, 2.99–3.23, 515–522
See application file for complete search history.

(56) References Cited

U.S. PATENT DOCUMENTS 5,568,571 A * 10/1996 Willis ................ G06K 9/00456
358/462
6,356,359 B1    3/2002 Motamed
(Continued)

FOREIGN PATENT DOCUMENTS

EP    0674289    9/1995

OTHER PUBLICATIONS

PCT International Search Report and Written Opinion, Oct. 20, 23,13 PCT Application No. PCT/EP2013/066001, European Patent Office, 8 pages.

*Primary Examiner* — Marcellus Augustin
(74) *Attorney, Agent, or Firm* — HP Inc—Patent Department

(57) ABSTRACT

A computer implemented method of analyzing the content of a digital image, for example a page to be printed, computes a boundary enclosing all the non-white content of the image. The image within the boundary is then divided into regions based on a predetermined division rule. For each region the number of unique colors and the proportion of non-white pixels are computed. The image is then categorized according to the result of those computations. The categorization can be used to automatically set print settings according to the content of the image.

19 Claims, 4 Drawing Sheets

(56) References Cited

U.S. PATENT DOCUMENTS

| | | |
|---|---|---|
| 8,154,737 B2 | 4/2012 | Ferlitsch |
| 8,965,140 B1 * | 2/2015 | Xu .......................... G06K 9/38 |
| | | 382/195 |
| 2003/0095268 A1 * | 5/2003 | Uribe ..................... G06K 1/123 |
| | | 358/1.1 |
| 2005/0226503 A1 * | 10/2005 | Bailey ................. G06K 9/4647 |
| | | 382/173 |
| 2007/0195344 A1 * | 8/2007 | Mochizuki ........... G06K 9/4652 |
| | | 358/1.9 |
| 2007/0216773 A1 * | 9/2007 | Kojima ............. G06F 17/30017 |
| | | 348/207.1 |
| 2009/0309894 A1 * | 12/2009 | Lam ..................... G06F 17/211 |
| | | 345/582 |
| 2010/0220927 A1 | 9/2010 | Kim et al. |
| 2011/0007359 A1 * | 1/2011 | Yamakawa .......... G03G 15/502 |
| | | 358/1.15 |
| 2012/0116935 A1 | 5/2012 | Nagarajan |
| 2014/0056501 A1 * | 2/2014 | Du ........................ G06T 7/0081 |
| | | 382/131 |
| 2014/0193029 A1 * | 7/2014 | Vassilieva .............. G06K 9/346 |
| | | 382/103 |

\* cited by examiner

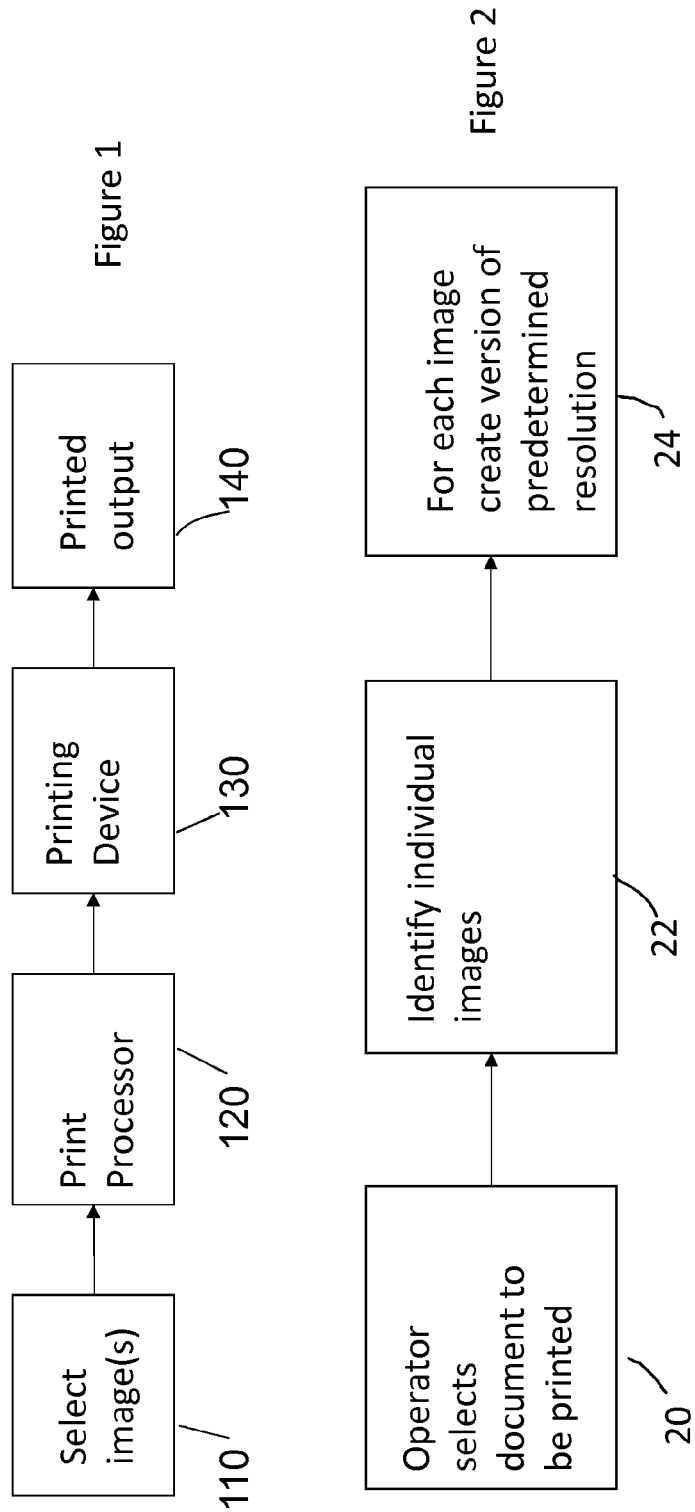

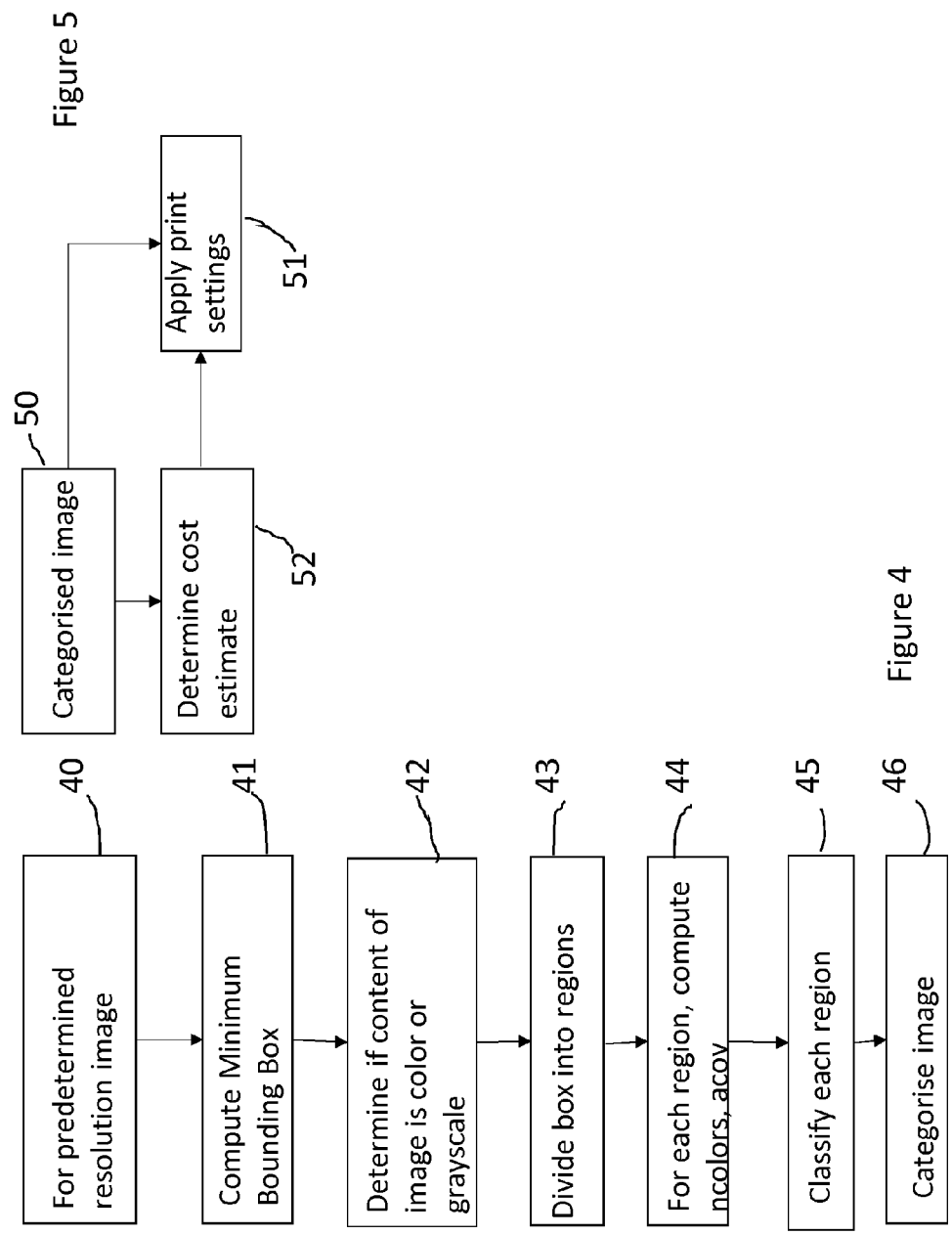

ANALYSING IMAGE CONTENT

CROSS-REFERENCE TO RELATED APPLICATION

This application is a U.S. National Stage Application of and claims priority to International Patent Application No. PCT/EP2013/066001, filed on Jul. 30, 2013, and entitled "ANALYSING IMAGE CONTENT," which is hereby incorporated by reference in its entirety.

BACKGROUND

In a digital reprographic business it is estimated that 70% of operator time is spent during job preparation, assigning print settings to every page (e.g., paper type, print quality, color mode . . . ), previewing, etc. It is desirable to automate that preparation.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 1 is a schematic illustration showing a printing system, including a print processor, for producing a print output;

FIG. 2 is an illustrative flow chart of a method of processing a document;

FIG. 4 is an illustrative flow chart of a method of categorising an image;

FIG. 5 is an illustrative flow chart of actions which may be applied to a categorised image.

DETAILED DESCRIPTION

Figure 3:
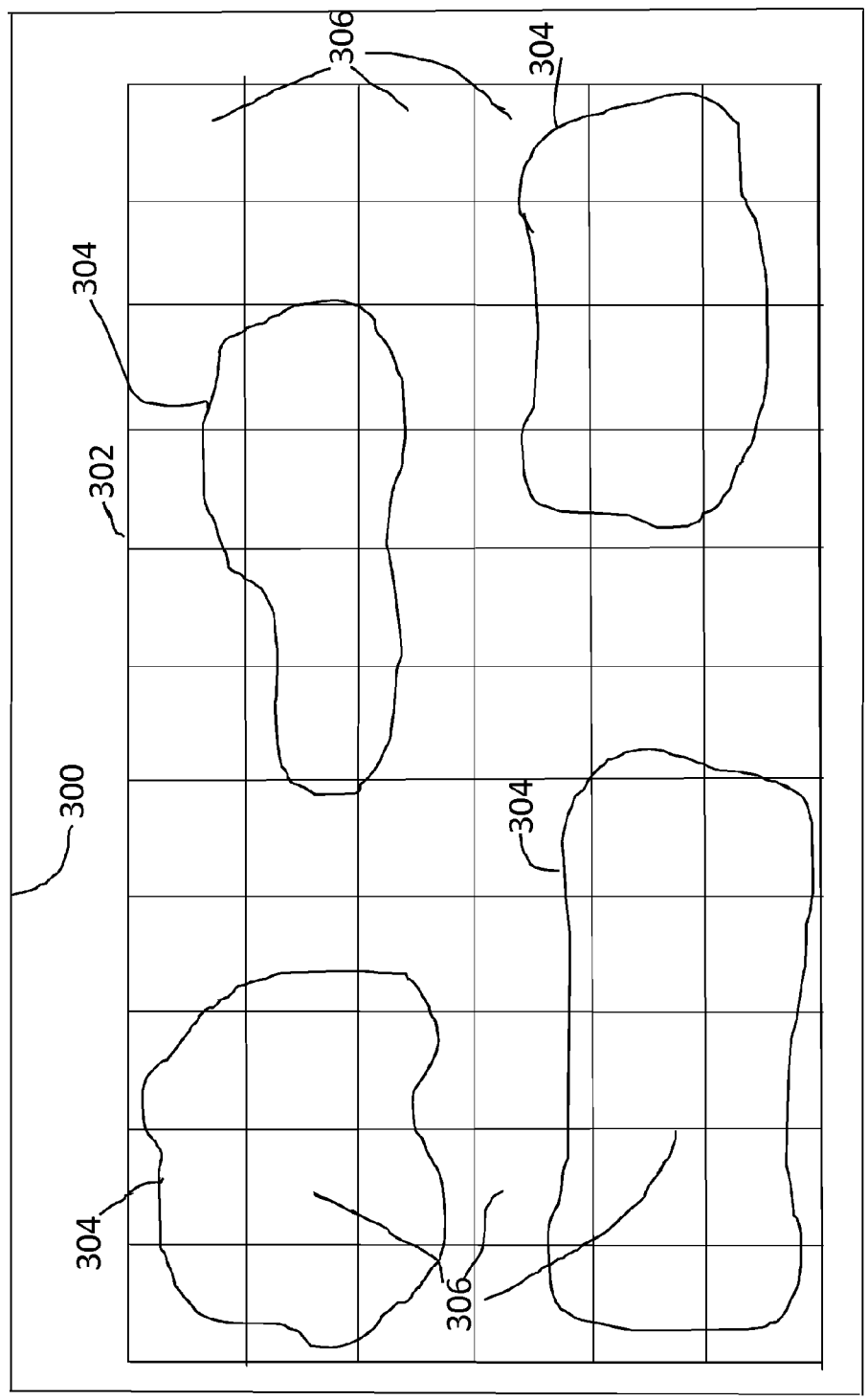
FIG. 3 is a schematic example of a lower resolution image produced by the method of FIG. 2.

FIG. 1 shows a printing system 100 that may be used with the methods described below. The printing system 100 may be used to produce a print output. The print output comprises inks, which may include black ink and colored inks, deposited on a print medium. In the example of FIG. 1, image data corresponding to an image 110 is sent to a print processor 120. The print processor 120 processes the image data. It then outputs print control data that is communicated to a printing device 130. The printing device generates a print output 140 as instructed by the print control data.

Printing a Document

Referring to FIG. 2, an embodiment of the invention will be described by way of example with reference to printing a document. An operator selects 20 a document to be printed. In this example, the document is a digital document which comprises one or more pages having a relatively high image resolution, for example greater than 1280 ×1024 pixels. The document is stored in memory accessible by the print processor 120. The print processor 120 is programmed to identify the individual pages of the document. For each identified page, the processor creates 24 an image of pre-determined, relatively lower, resolution for example 1280× 1024 pixels. 1280×1024 has been found to be sufficient for carrying out the image process of FIG. 4 on page print sizes up to A0.

The method of FIG. 4 is an example of processing a lower resolution image 300 produced by the method of FIG. 2. FIG. 3 shows a simplified schematic example of such an image having an arbitrary number of areas 304 which are not white. The areas may contain grayscale pixels and/or color pixels. It will be appreciated that a real image may be more complex than the much simplified image of FIG. 4.

Referring to FIGS. 3 and 4, in step 40, the lower resolution image is accessed and in step 41 a minimum bounding box 302 is computed. The bounding box of FIG. 3 is computed to be the smallest rectangle which encompasses all the non-white areas 304 of the image.

Step 42 determines whether the content within the bounding box 302 contains color pixels or is entirely or mostly of grayscale pixels. This step is automatic. This step sets the printing device to a print setting, called render-mode, which has two values: grayscale and color. The grayscale setting may be selected even if a small portion of the image comprises color pixels.

Step 42 may be carried out as follows. A specialized ICC output profile is used. It operates in the $L^*a^*b^* \rightarrow RGB$ (output) direction and in the media-relative colorimetric intent.

For the example of document in portable document format (PDF), a PDF rasterizer is used to produce an image of the document. Default device RGB, Gray and CMYK color spaces of the PDF rasterizer are set to ICC Based spaces, such as standard RGB and SWOP (Specifications for Web Offset Publications), to produce the image. This forces all elements of the PDF to be evaluated across the ICC workflow and therefore all PDF elements are converted to the ICC profile connection space (PCS) which is colorimetric. Then, this specialized ICC profile gets PCS colorimetric information in the $L^*a^*b^*$ color space.

The profile uses the $a^*/b^*$ axis to detect whether a given pixel has chroma. A threshold is provided on how much chroma triggers the detection, obtaining in this way detection of documents that are not completely gray, but very close. The threshold may be selected by the operator.

As a result of the processing done by the ICC profile, a function of the amount of chroma is copied to the R output channel. This gives a robust indication of whether the given image is gray, close-to-gray or has color information. In an illustrative implementation 0 is used for no chroma and a number in the range 1 . . . 255 is used for small amounts of $C^*$.

Step 43 divides the area within the bounding box into regions 306. In the example of FIG. 3, the bounding box is divided into uniform rectangles of preset size (only a few of which are labelled 306), for example squares, but other types of region may be used instead as will be described below.

For each region 306 the following two parameters are computed at step 44:

ncolors which is the number of unique colors in the region; and acover which is the proportion of non-white pixels in the region. In this example acover is a percentage.

In step 45, each region is classified according to the values of the parameters ncolors and acover to determine the image type, where in this example the region types are cad, photo and gis, where. "cad" denotes computer aided design images and "gis" denotes an image of geographical information, for example a map.

The parameters ncolors and acover are compared with respective predetermined values, there being different predetermined values for the different types of regions. An example of the classification is:

cad=if(acov<=0.5 & ncolors<=10);
photo=if(acov<=0.5 & ncolors>50);
gis=if(acov>0.5 & ncolors<=50.

The classification of the regions may take place sequentially or in parallel.

Step 46 categorises the whole image content with in the boundary box according to different predetermined categories the following categories which are dependent on the classifications of the regions of step 45 and on the result of step 42. The categorisation is based for example on the proportion of the regions having a particular classification. In an embodiment the proportion or percentage of regions having a particular classification (e.g. cad) is compared to a predetermined value; if the proportion equals or exceeds the value, the image is categorised as complying with that classification (e.g. cad).

In an embodiment, each region is tagged as cad, photo or gis. Once all the regions have been tagged the percentages of regions having the different tags is calculated.

| | |
|---|---|
| CAD Grayscale | Grayscale page in which 80% or more regions are classified as CAD. |
| CAD Color | Color page in which 80% or more regions are classified as CAD in step 45. |
| Photo | More than 80% of regions are classified as photo in step 45. |
| GIS | More than 80% of regions are classified as gis in step 45. |
| Poster | The image cannot be categorised according to any of the preceding categories. |

Referring to FIG. 5 in which step 50 corresponds to the result of step 46, in an embodiment of the invention, predetermined print settings are automatically selected and applied by the print processor to the printing device according to the categorisation of the image.

In this example, the print settings are

| Category | Paper Type | Print Quality | Color Mode |
|---|---|---|---|
| CAD Grayscale | Plain | Fast | Grayscale |
| CAD Color | Plain | Normal | Color |
| PHOTO | Glossy | Best | Color |
| GIS | Heavy Coated | Normal | Color |
| POSTER | Coated | Normal | Color |

The process of FIG. 4 provides a simple analysis of the content of an image which is effective to automatically select print settings for automatic application to a printing device. In addition, the process of FIG. 5 may include step 42, which provides an estimate of the cost of printing the image based on the categorisation of the image at step 46.

An example of a cost estimate is

| Category | Price $/ unit area | Paper Type | Print Quality | Color Mode |
|---|---|---|---|---|
| CAD Grayscale | X | Plain | Fast | Grayscale |
| CAD Color | Y | Plain | Normal | Color |
| PHOTO | Z | Glossy | Best | Color |
| GIS | K | Heavy Coated | Normal | Color |
| POSTER | L | Coated | Normal | Color |

This illustrative cost estimate prices the print per page in $/unit area for example square feet or square meters, but instead it may price the printing on some other basis, for example the number of sheets to be printed and the size of the sheets according to standard sheet sizes such as A0 to A5 et cetera.

For a document having two or more pages, the process of FIGS. 4 and 5 is repeated for each page. Print settings are automatically applied for each page and each page may have a different print setting according to the category assigned to it. A cost estimate may be produced for each page. A total cost estimate for the whole document is the sum of the individual page cost estimates.

Computing the Minimum Bounding Box

It is known how to compute the minimum bounding box. An example of computing the minimum bounding box scans successive rows of pixels. The rows are scanned starting at the top of the image and the color of each pixel is determined. Each row is scanned until the scanning finds a pixel different from white. This is the top value of the top-left corner of the bounding box. Then each subsequent row is scanned, detecting the left and right corners until a row that is entirely white is reached. That row is the bottom value of the bottom-right corner.

Alternative Regions 300

In FIG. 3, the boundary box is divided into uniform rectangular regions. However the boundary box may be divided in other ways, for example Manhattan-based layout, color segmentation and edge preservation amongst others.

A Manhattan layout decomposes an image into rectangular, non-overlapping, regions. This may be done using for example the XY-cut algorithm, of Nagy, G. and Seth, S. and Viswanathan, M.: A Prototype Document Image-Analysis System for Technical Journals. Computer 25, (1992), 10-22; or the algorithm of Baird, H. S. and Jones, S. E. and Fortune, S. J.: Image Segmentation by Shape-Directed Covers, in Proceedings of International Conference on Pattern Recognition, Atlantic City, N.J. (1990), 820-825.

In color segmentation, regions are constructed by the union of connected pixels that have a similar color. There are several algorithms, two well-known ones are:

P. S. Heckbert, "Color Image Quantization for Frame Buffer Display," Computer Graphics, Vol. 16, No. 3, pp. 297-303, 1982; and M. T. Orchard and C. Bouman, "Color Quantization of Images," IEEE Trans. on Signal Processing, Vol. 35, No. 12, pp. 2677-2690, December 1991.

Edge preservation is a similar concept to color segmentation, where regions are not allowed to cross luminosity edges.

Example of a Print Processor

Figure 6:
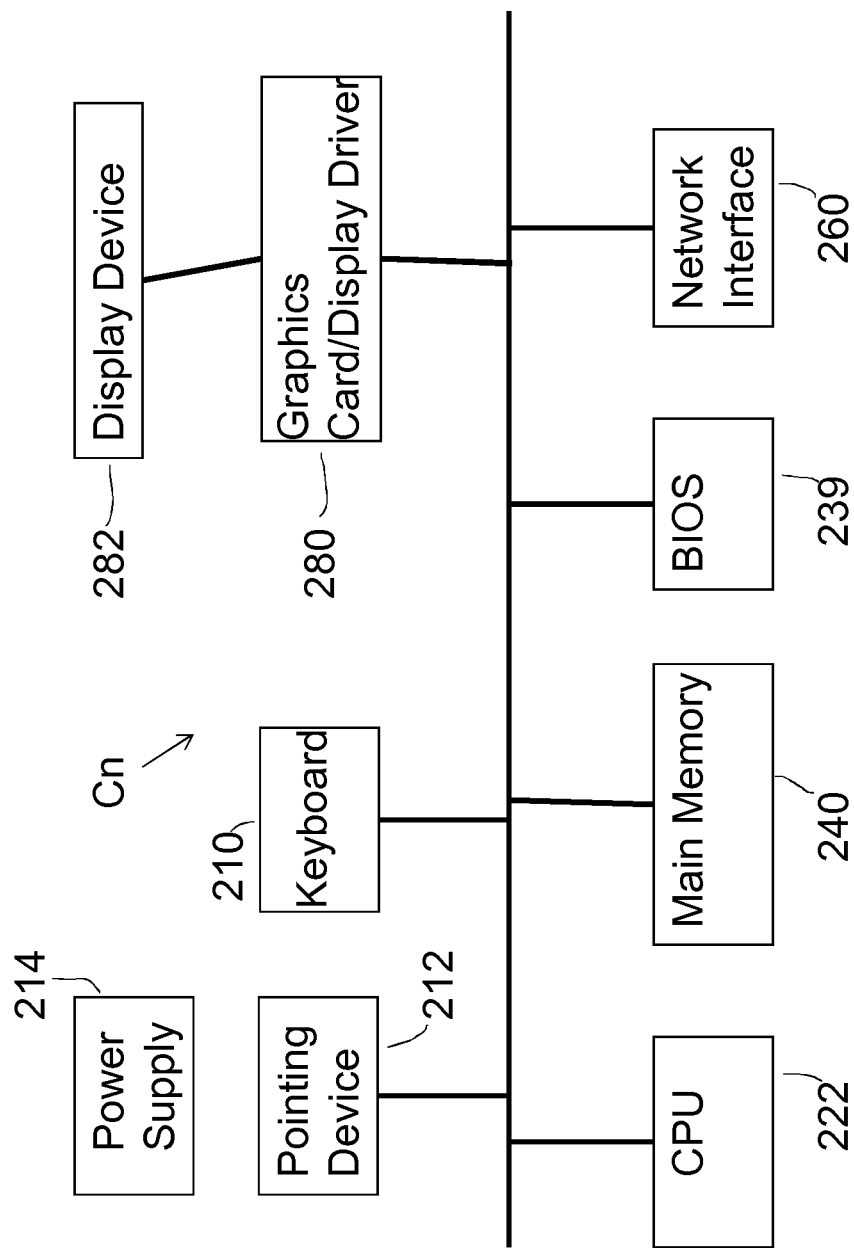
FIG. 6 is a schematic block diagram of the print processor of FIG. 1.

The print processor 120 may be a computer as shown in FIG. 6 running a computer program to implement the processes described above. The computer of FIG. 6 comprises, amongst other items: a CPU 222; a main memory 240 for example a hard disk drive or other storage device, for example electronic memory; a network interface 260; a display driver 280 coupled to a display device 282; human interface devices or input devices for example a keyboard 210 and a pointing device 212; and one or more busses 216. The items are conventional and interact via the buss(es) in a conventional way. The network interface 260 is couples the computer 120 to the printing device 130 via a communications network 14 link. The computer also comprises a power supply 214. Programs are stored in the main memory 240 and executed by the CPU 222. The interface 260 may be a USB interface.

The pages or images to be processed and the reduced resolution images of step 24 may be stored in the main memory 240. The print settings may be applied to the printing device via the network interface 260.

It will be understood that print processor may in practice be provided by a single chip or integrated circuit or plural chips or integrated circuits, optionally provided as a chipset, an application-specific integrated circuit (ASIC), field-programmable gate array (FPGA), etc. For example, this may apply to all or part of the print processor or other printer control circuitry. The chip or chips may comprise circuitry (as well as possibly firmware) for embodying at least a data processor or processors as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

An embodiment of the print processor 120 is configured to implement the steps of: a) computing by the CPU 222 a boundary enclosing all the non-white content of the image; b) dividing by the CPU 222 the enclosed non-white content into regions based on a predetermined division rule; c) for each region, computing by the CPU 222 the number of unique colours and the proportion of non-white pixels; and d) categorising by the CPU 222 the image according to the result of the computation in step c).

Computer Programs

At least some aspects of the examples described herein with reference to the drawings may be implemented using computer processes operating in the print processor. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes described herein. The carrier may be any entity or device capable of carrying the program, for example the main memory 240 of the computer of FIG. 6. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

An embodiment of the invention provides a non-transitory digital storage medium storing a computer program which, when run on a computer, implements the steps of: a) computing a boundary enclosing all the non-white content of the image; b) dividing the enclosed non-white content into regions based on a predetermined division rule; c) for each region, computing the number of unique colours and the proportion of non-white pixels; and d) categorising the image according to the result of the computation in step c).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer implemented method of analyzing content of a digital image, the method comprising:
   computing a boundary enclosing non-white content of the digital image;
   dividing the enclosed non-white content into regions based on a predetermined division rule;
   for each region, determining a number of unique colors within the non-white content as presented in a conversion of the digital image to an international color consortium (ICC) profile connection space (PCS), and a proportion of non-white pixels;
   categorizing the digital image based on the number of unique colors and the proportion of non-white pixels computed for each region; and
   producing an estimate of a cost of printing the digital image based on the category of the image.

2. The method according to claim 1, further comprising automatically assigning a print setting to the image according to the categorization of the image.

3. The method according to claim 2, wherein the category comprises grayscale CAD, color CAD, photo, GIS, or poster.

4. The method according to claim 1, comprising deriving the digital image as a lower resolution image from a higher resolution image.

5. The method according to claim 1, wherein computing the boundary enclosing all the non-white content of the digital image comprises computing a minimum bounding box containing all the non-white content of the digital image.

6. The method according to claim 1, wherein the regions are rectangles or are regions based on Manhattan layout, color segmentation, or edge preservation.

7. The method of claim 1, further comprising:
   automatically determining whether an image is a grayscale image or a color image; and
   if it is a color image, carrying out the method of claim 1 on the color image.

8. A printing system for printing a digital image and comprising a computer programmed to:
   compute a boundary enclosing non-white content of the digital image;
   divide the enclosed non-white content into regions based on a predetermined division rule;
   for each region, determine a number of unique colors within the non-white content as presented in a conversion of the digital image to an international color consortium (ICC) profile connection space (PCS), and a proportion of nonwhite pixels;
   categorize the digital image based on the number of unique colors and the proportion of non-white pixels computed for each region; and
   assigning a print setting to the image according to the categorization of the image,
   wherein the category comprises grayscale CAD, color CAD, photo, GIS, or poster.

9. The printing system according to claim 8, further programed to produce an estimate of a cost of printing the digital image based on the category of the image.

10. The printing system according to claim 8, wherein computing the boundary enclosing all the non-white content of the digital image comprises computing a minimum bounding box containing all the nonwhite content of the digital image.

11. The printing system according to claim 8, wherein the regions are rectangles or are regions based on Manhattan layout, color segmentation, or edge preservation.

12. A computer program product for analyzing content of a digital image, the computer program product comprising:

a non-transitory computer readable storage medium comprising computer usable program code embodied therewith, the computer usable program code to, when executed by a processor:
  computing a boundary enclosing all non-white content of the digital image;
  dividing the enclosed non-white content into regions based on a predetermined division rule:
  for each region, determining a number of unique colors within the non-white content as presented in a conversion of the digital image to an international color consortium (ICC) profile connection space (PCS), and a proportion of non-white pixels; and
  categorizing the digital image based on the number of unique colors and the proportion of non-white pixels computed for each region,
  wherein the category comprises grayscale CAD, color CAD, photo, GIS, or poster.

13. The computer program product of claim 12, further comprising computer usable program code to, when executed by the processor, produce an estimate of a cost of printing the digital image based on the category of the image.

14. The computer program product of claim 12, further comprising computer usable program code to, when executed by the processor, derive the digital image as a lower resolution image from a higher resolution image.

15. The computer program product of claim 12, further comprising computer usable program code to, when executed by the processor, determine whether an image is a grayscale image or a color image.

16. The computer program product of claim 12, further comprising computer usable program code to, when executed by the processor, automatically assign a print setting to the image according to the categorization of the image.

17. The computer program product of claim 12, wherein computing the boundary enclosing all the non-white content of the digital image comprises computing a minimum bounding box containing all the non-white content of the digital image.

18. The computer program product of claim 12, wherein the regions are rectangles or are regions based on Manhattan layout, color segmentation, or edge preservation.

19. The computer program product of claim 12, further comprising computer usable program code to, when executed by the processor:
  automatically determine whether an image is a grayscale image or a color image; and
  if it is a color image, carry out the method of claim 16 on the color image.

* * * * *

UNITED STATES PATENT AND TRADEMARK OFFICE
CERTIFICATE OF CORRECTION

PATENT NO. : 9,696,950 B2  
APPLICATION NO. : 14/908372  
DATED : July 4, 2017  
INVENTOR(S) : Jordi Arnabat Benedicto et al.

Page 1 of 1

It is certified that error appears in the above-identified patent and that said Letters Patent is hereby corrected as shown below:

In the Claims

In Column 6, Line 47, in Claim 8, delete "nonwhite" and insert -- non-white --, therefor.

In Column 6, Line 61, in Claim 10, delete "nonwhite" and insert -- non-white --, therefor.

In Column 7, Line 8 approx., in Claim 12, delete "rule:" and insert -- rule; --, therefor.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*